(12) United States Patent
Joyce

(10) Patent No.: US 12,304,241 B2
(45) Date of Patent: *May 20, 2025

(54) VEHICLE TRACTION MAT

(71) Applicant: SBI Smart Brands International (America) Ltd., Vaughan (CA)

(72) Inventor: Michael Joyce, Richmond Hill (CA)

(73) Assignee: SBI Smart Brands International (America) Ltd., Vaughan (CA)

( * ) Notice: Subject to any disclaimer, the term of this patent is extended or adjusted under 35 U.S.C. 154(b) by 639 days.

This patent is subject to a terminal disclaimer.

(21) Appl. No.: 17/007,392

(22) Filed: Aug. 31, 2020

(65) Prior Publication Data

US 2020/0398612 A1 Dec. 24, 2020

Related U.S. Application Data

(63) Continuation of application No. 15/938,557, filed on Mar. 28, 2018, now Pat. No. 10,759,224.

(60) Provisional application No. 62/477,794, filed on Mar. 28, 2017.

(51) Int. Cl.
*B60B 39/12* (2006.01)

(52) U.S. Cl.
CPC ........ *B60B 39/12* (2013.01); *B60B 2900/721* (2013.01)

(58) Field of Classification Search
CPC .......................... B60B 39/12; B60B 2900/721
USPC .......................................................... 238/14
See application file for complete search history.

(56) References Cited

U.S. PATENT DOCUMENTS

| 1,375,666 | A | * | 4/1921 | Bauer | B60B 39/12 238/14 |
| --- | --- | --- | --- | --- | --- |
| 3,836,075 | A | * | 9/1974 | Botbol | B60B 39/12 238/14 |
| 4,210,280 | A | * | 7/1980 | Reisner | B60B 39/12 238/14 |
| D348,240 | S | * | 6/1994 | Chiang | D12/608 |
| 5,439,171 | A | * | 8/1995 | Fruend | B60B 39/12 238/14 |
| 5,538,183 | A | * | 7/1996 | McGee | B60B 39/12 238/14 |
| 6,779,738 | B1 | * | 8/2004 | Stannard | B60B 39/12 238/14 |
| 8,210,443 | B2 | * | 7/2012 | Studstill | B60B 39/00 238/14 |

(Continued)

FOREIGN PATENT DOCUMENTS

| GB | 2251789 A | * | 7/1992 | ............. B60B 39/12 |
| --- | --- | --- | --- | --- |
| WO | WO-2005042276 A1 | * | 5/2005 | ............. B60B 39/12 |

*Primary Examiner* — Zachary L Kuhfuss
*Assistant Examiner* — James William Jones
(74) *Attorney, Agent, or Firm* — CASSAN MACLEAN IP AGENCY INC.

(57) ABSTRACT

A vehicle traction mat for use to extricate a vehicle stuck on a slippery road surface is provided. The traction mat comprises at least a first mat segment having a plurality of surface cleats, knobs, and knob cleats on a road-facing surface thereof. The cleats and knobs provide traction between the traction mat and the slippery surface. The traction mat may be provided with one or more mat segments. Each of the mat segments of the vehicle traction mat may be foldably connected to opposite ends of another one of the mat segments. The traction mat may have cleats, knobs, and knob cleats on the tire-facing surface thereof.

2 Claims, 18 Drawing Sheets

(56) References Cited

U.S. PATENT DOCUMENTS

| | | | |
|---|---|---|---|
| 9,701,160 B2* | 7/2017 | Dagrossa | B60B 39/12 |
| D932,994 S* | 10/2021 | Joyce | D12/608 |
| D942,777 S* | 2/2022 | Hua | D6/585 |
| 2003/0137128 A1* | 7/2003 | Raffo | A63C 9/00 |
| | | | 280/14.22 |
| 2014/0103131 A1* | 4/2014 | Nutzati | B60B 39/12 |
| | | | 238/14 |
| 2017/0174000 A1* | 6/2017 | Dagrossa | E01C 15/00 |

* cited by examiner

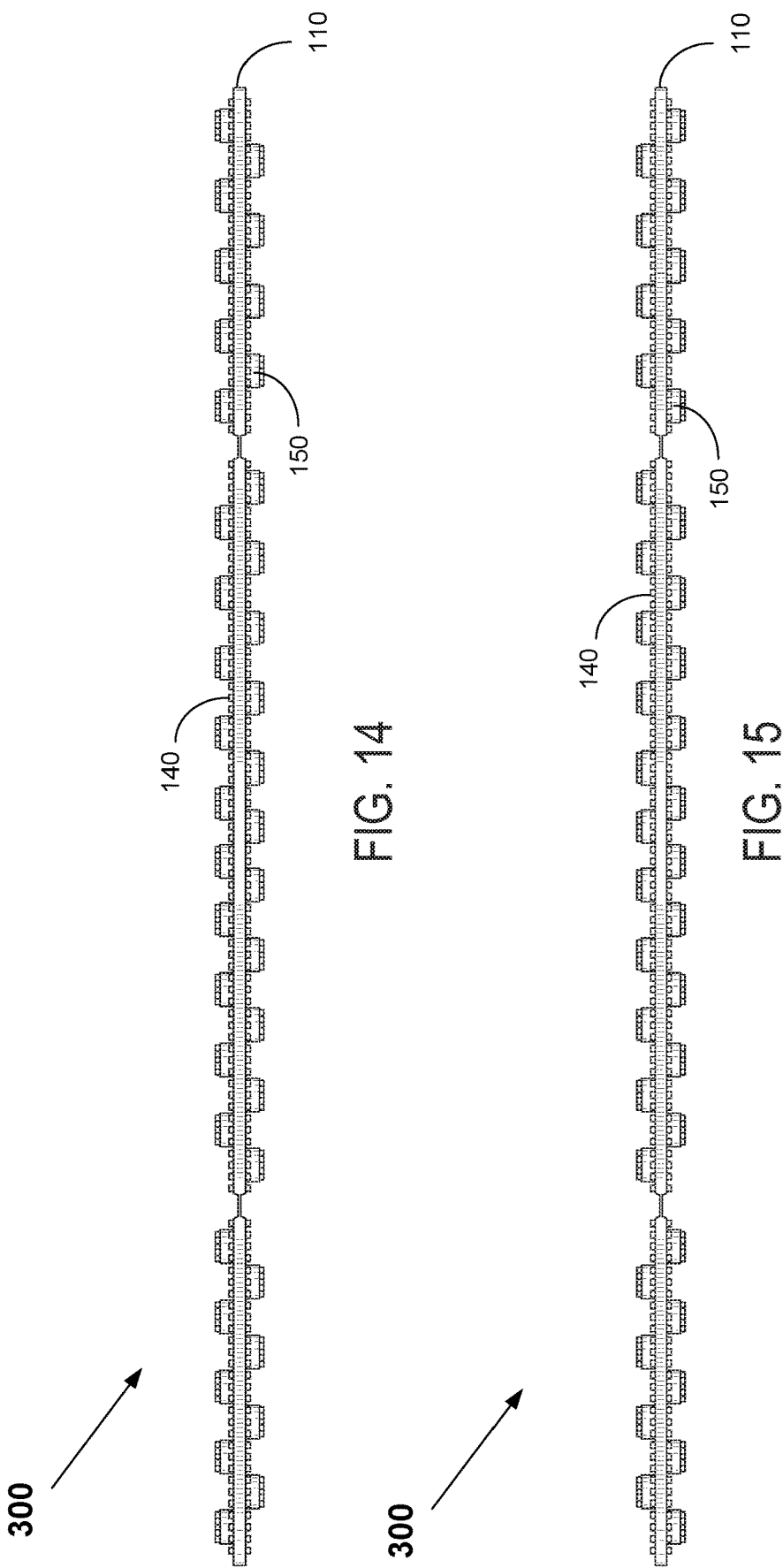

VEHICLE TRACTION MAT

RELATED APPLICATIONS

This application claims priority from U.S. Provisional Patent Application No. 62/477,794 filed Mar. 28, 2017; the contents of which are herein expressly incorporated by reference.

TECHNICAL FIELD

The present invention relates generally to automotive accessories, and more specifically to a vehicle traction mat that is placed under the drive wheels of a vehicle to provide extra traction in mud, snow, sand, or other surfaces which cause reduced traction.

BACKGROUND

As vehicles are driven in various road conditions such as mud, snow, or sand, the possibility of the vehicle being stuck increases. This is due to the reduced traction of the road. Often vehicle tires may be stuck in potholes, or ruts which are long deep tracks made by the repeated passage of the wheels of vehicles. To enable a stuck vehicle to be driven out of a rut or a pothole, for example, motorists have typically placed miscellaneous objects under the rotating tires of drive wheels, such as sand, salt, floor mats, wooden boards, and pieces of carpeting. Such objects are typically ineffective, and in some cases hazardous, as they may get caught by the rotating tire and simply fly away thus potentially injuring bystanders.

Vehicle traction mats have been known for many years and are used to provide additional traction to a rotating tire to extricate a stuck vehicle from snow, mud, sand, or any other slippery road condition. They provide an advantage in time and costs savings to stranded motorists who would otherwise have to wait for an emergency service provider truck for winching the stranded vehicle back to the roadway, and pay for that service. Some prior art mats use metal studs to engage the snow, or mud surface. Such vehicle traction mats are hard to handle and pose a risk of injury to the hands. Other vehicle traction mats rely on pins that are captivated therein, but such vehicle traction mats are complicated to make, and the pins may sometimes break off.

SUMMARY OF THE INVENTION

In one aspect of the present invention, there is provided a vehicle traction mat, comprising a generally planar first mat segment having a tire-facing surface and a road facing surface and a generally planar second mat segment having a tire-facing surface and a road-facing surface, the second mat segment being foldably connected at an edge thereof to an edge of the first mat segment via connecting means. A plurality of spaced-apart knobs are formed on the road-facing surface on at least one of the first or second mat segments, for providing traction between the vehicle traction mat and a road surface. A plurality of spaced apart knob-cleats are formed on the top surface of at least some of the plurality of spaced apart knobs formed on the road-facing surface, for providing additional traction between the vehicle traction mat and the road surface.

The vehicle traction mat may further comprise a plurality of spaced-apart surface cleats formed on the tire-facing surface for providing traction between the vehicle traction mat and a vehicle tire.

The vehicle traction mat may further comprise a plurality of spaced-apart cleats formed on the road-facing surface and located between the spaced-apart knobs, for providing additional traction between the vehicle traction mat and the road surface.

The vehicle traction mat may further comprise a plurality of spaced-apart knobs formed on the tire-facing surface of the mat segment, and a plurality of spaced-apart knob cleats formed on a top surface of at least some of the plurality of spaced-apart knobs formed on the tire-facing surface, for providing additional traction between the vehicle traction mat and a vehicle tire.

The vehicle traction mat may further comprise a plurality of spaced-apart cleats formed on the tire-facing surface and located between the spaced-apart knobs formed on the tire-facing surface, for providing further traction between the vehicle traction mat and the vehicle tire.

The vehicle traction mat may further comprise at least a second planar mat segment foldably connected at an edge thereof to an edge of the first mat segment via connecting means.

The main mat segment and the at least one other mat segment may have similar knob and cleat configurations on corresponding surfaces thereof.

The knobs on the road-facing surface of the second mat segment may fit between the knobs on the road-facing surface of the first mat segment when the second mat segment is folded into the first mat segment and vice versa.

The knobs on the road-facing surface of the other mat segment may be offset by a different distance from the connecting means, than the knobs on the road-facing surface of the main mat segment are.

The connecting means may comprise a traverse strip of material having a reduced thickness, or a hinge.

The main mat segment, and the at least one other mat segment may have similar dimensions for an optimal overall size of the traction mat when folded onto one another in a fully folded position.

The at least one other mat segment may comprise two edge mat segments each foldably connected to the main mat segment by means of a first and a second connecting means.

The two edge mat segments may be equal in size and may each have a length that is less than or equal to half the length of the main mat segment, such that the area of the vehicle traction mat in a fully folded position is the substantially same as the area of the main mat segment.

The at least one other mat may comprise a plurality of mat edges foldably connected to the main mat segment via a plurality of connecting means.

The main mat segment and the at least one other mat segment may be generally rectangular in shape.

The main mat segment may be made of resilient material.

The knobs formed on the road-facing surface of the main mat segment may have a cylindrical shape The knobs formed on the road-facing surface of the main mat segment may be uniformly spaced, or closely spaced in a center region of the main mat segment and widely spaced at the edges thereof.

BRIEF DESCRIPTION OF THE DRAWINGS

Embodiments will now be described, by way of example only, with reference to the attached figures, wherein:

FIG. 14 is a front elevation view of the vehicle traction mat of FIG. 9;

FIG. 15 is a rear elevation view of the vehicle traction mat of FIG. 9;

DETAILED DESCRIPTION OF THE EMBODIMENTS

Figure 1:
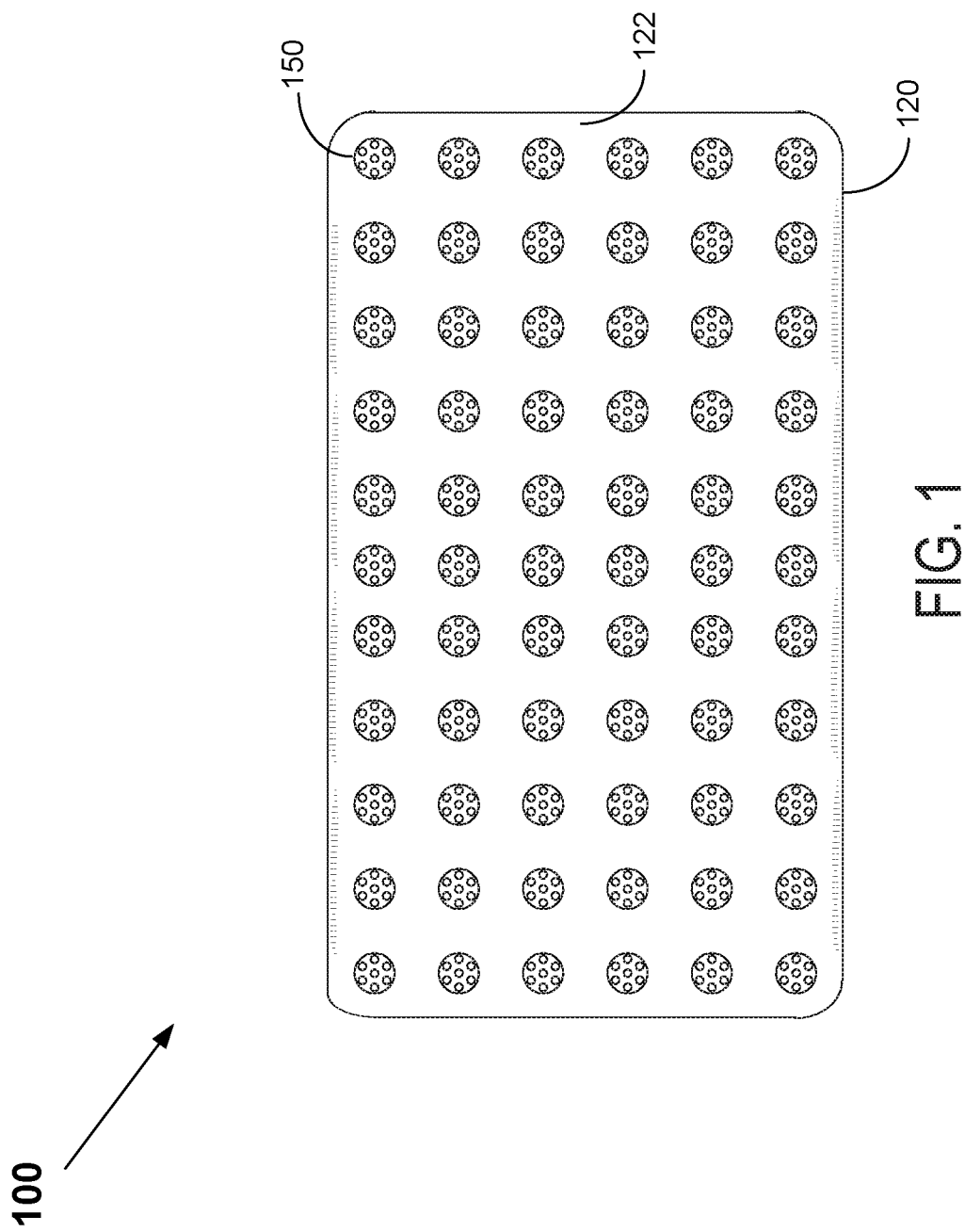
FIG. 1 is a plan view of a road-facing surface of a vehicle traction mat, in accordance with an embodiment of the present disclosure.

Embodiments will now be described, by way of example only, and not limitation. With reference to FIGS. 1-5, a vehicle traction mat 100 is provided. Vehicle traction mat 100 may be made from rubber, resin polymer, or any other suitable resilient material for providing traction. Vehicle traction mat 100 is of sufficient thickness so as to be durable and be able to withstand the harsh conditions of being placed under a rotating vehicle tire. A typical thickness may be in the range of 3 mm to 10 mm, but other thickness ranges are also contemplated. Vehicle traction mat 100 is comprised of a generally flat main mat segment 120 having a road-facing surface 122, and a tire-facing surface 124. In one embodiment, as shown in FIG. 1, the road-facing surface 122 is provided with a plurality of knobs 150. Knobs 150 may be spaced apart on the road-facing surface 122 of vehicle traction mat 100, for digging into a slippery surface and providing traction between vehicle traction mat 100 and the road surface. A slippery surface may comprise snow, ice, mud, sand, or ice. At least some of knobs 150 may be provided with spaced apart knob cleats 160 formed on the top surface thereof. Knob cleats 160 provide additional tracking between the mat and the slippery road surface as they grip onto the slippery surface. For the embodiment depicted in the figures, knobs 150 are shown to be cylindrical in shape; however other shapes are also contemplated. For example knobs 150 may have an irregular shape, a quadrilateral profile, a triangular profile, a hexagonal profile, an octagonal profile, or any other prism shape. In one embodiment, knobs 150 may be tapered as they extend outwardly from surface 122. The tapering may assist in digging into tough but slippery road surfaces. For example, knobs 150 may be frusto-conical in shape, or in the shape of a truncated pyramid. Knobs 150 may be uniformly spaced across the entirety of the road-facing surface 122, as shown in the figures. Alternatively (not shown), knobs 150 may be closely spaced in a center region of the road-facing surface 122, and widely spaced closer to the edges thereof.

Figure 2:
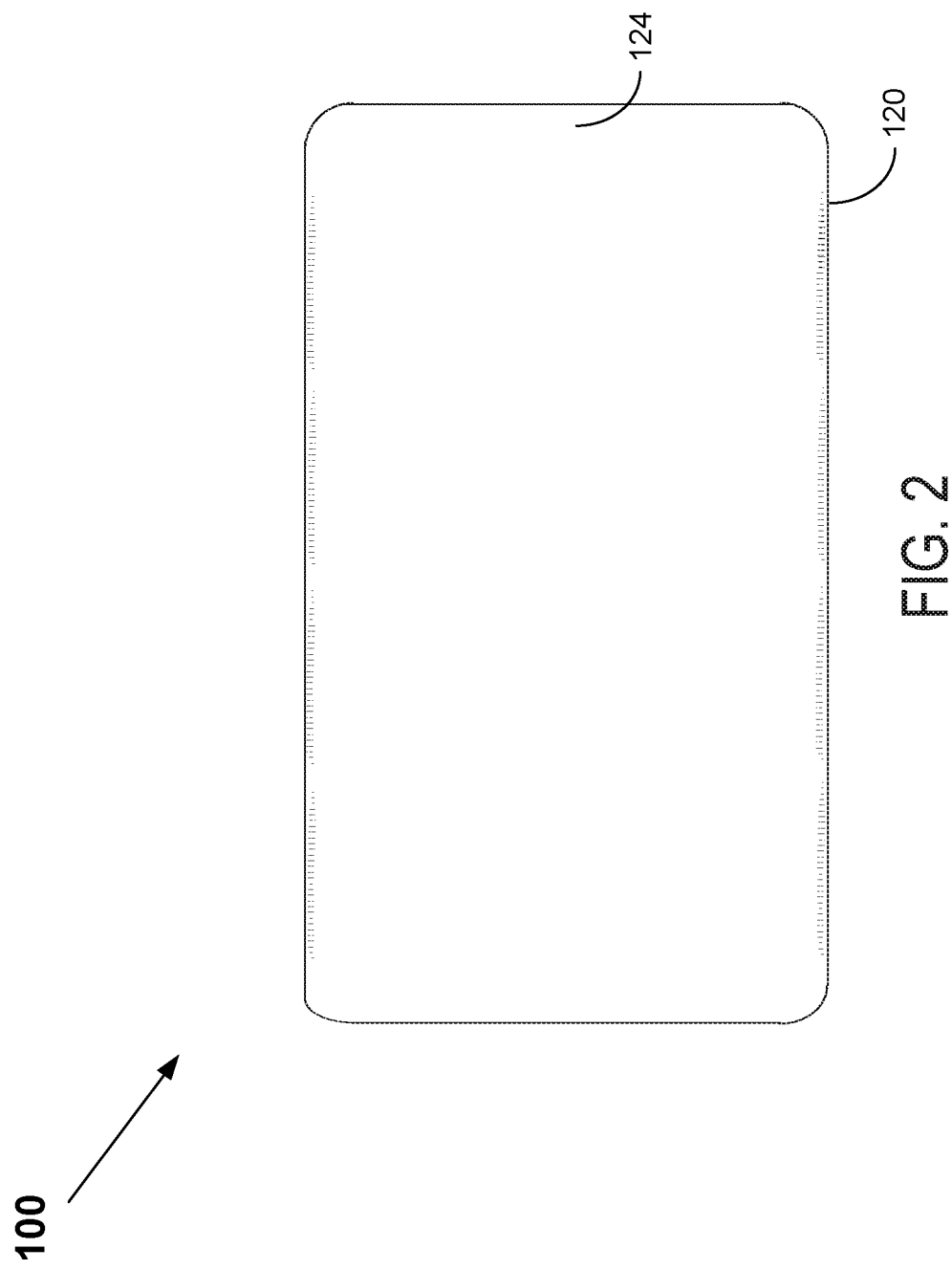
FIG. 2 is a plan view of a tire-facing surface of the vehicle traction mat of FIG. 1.
Figure 3:
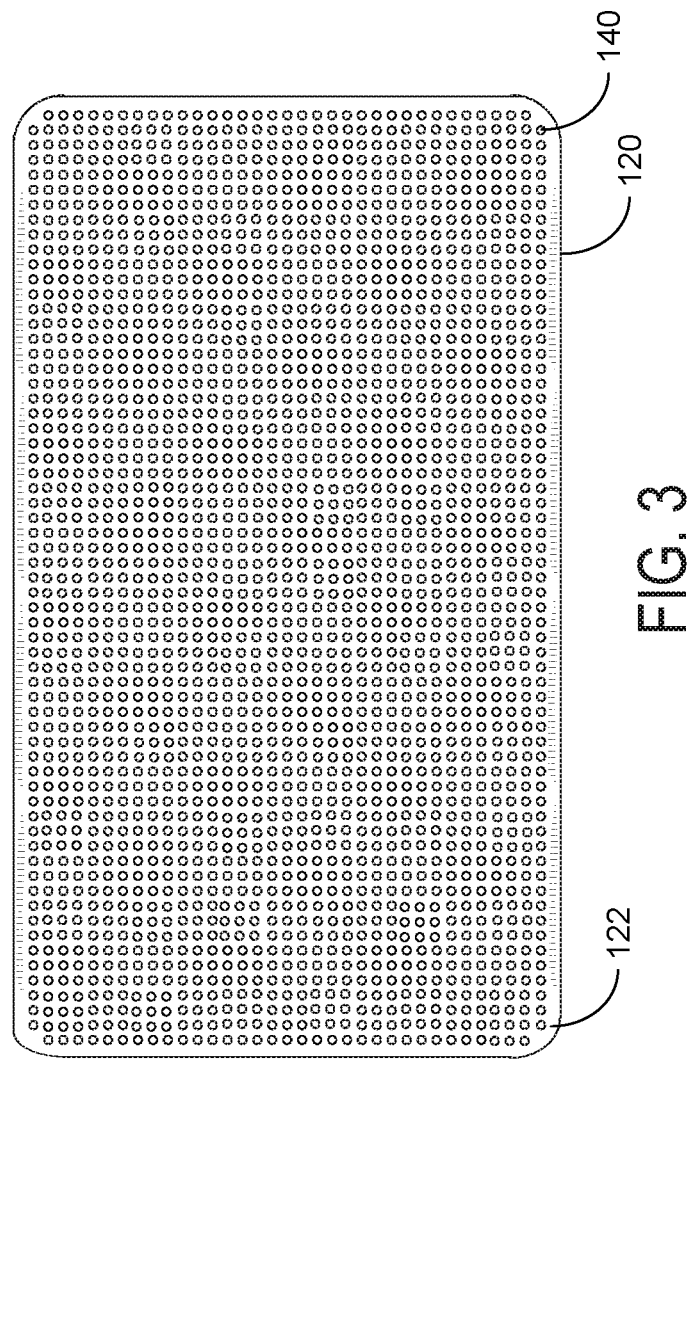
FIG. 3 is a plan view of another tire-facing surface of the vehicle traction mat of FIG. 1, in accordance with another embodiment of the present disclosure.

In one embodiment, shown in FIG. 2, the tire-facing surface 124 of the main mat segment 120 is a rough surface which provides traction with a vehicle tire. In another embodiment, shown in FIG. 3, the tire-facing surface 124 is provided with a plurality of cleats 140 for providing additional traction with a vehicle tire when it comes in contact therewith. Pleats 140 are spaced apart on surface 124, and may be uniformly spaced across the entirety of surface 124. Alternatively, pleats 140 may be closely spaced in a center region of the tire-facing surface 124, and widely spaced closer to the edges thereof.

In one embodiment, shown in FIG. 2, the tire-facing surface 124 of the main mat segment 120 is a rough surface which provides traction with a vehicle tire. In another embodiment, shown in FIG. 3, the tire-facing surface 124 is provided with a plurality of cleats 140 for providing additional traction with a vehicle tire when it comes in contact therewith. Cleats 140 are spaced apart on surface 124, and may be uniformly spaced across the entirety of surface 124. Alternatively, cleats 140 may be closely spaced in a center region of the tire-facing surface 124, and widely spaced closer to the edges thereof.

In one embodiment, the tire-facing surface 124 of main mat segment 120 is provided with a plurality of knobs 150 and knob cleats 160, similar to surface 122 shown in FIG. 1. This improves traction with the vehicle tires particularly, if the tread is worn, or if the tires are summer tires with little tread thereon.

Figure 4:
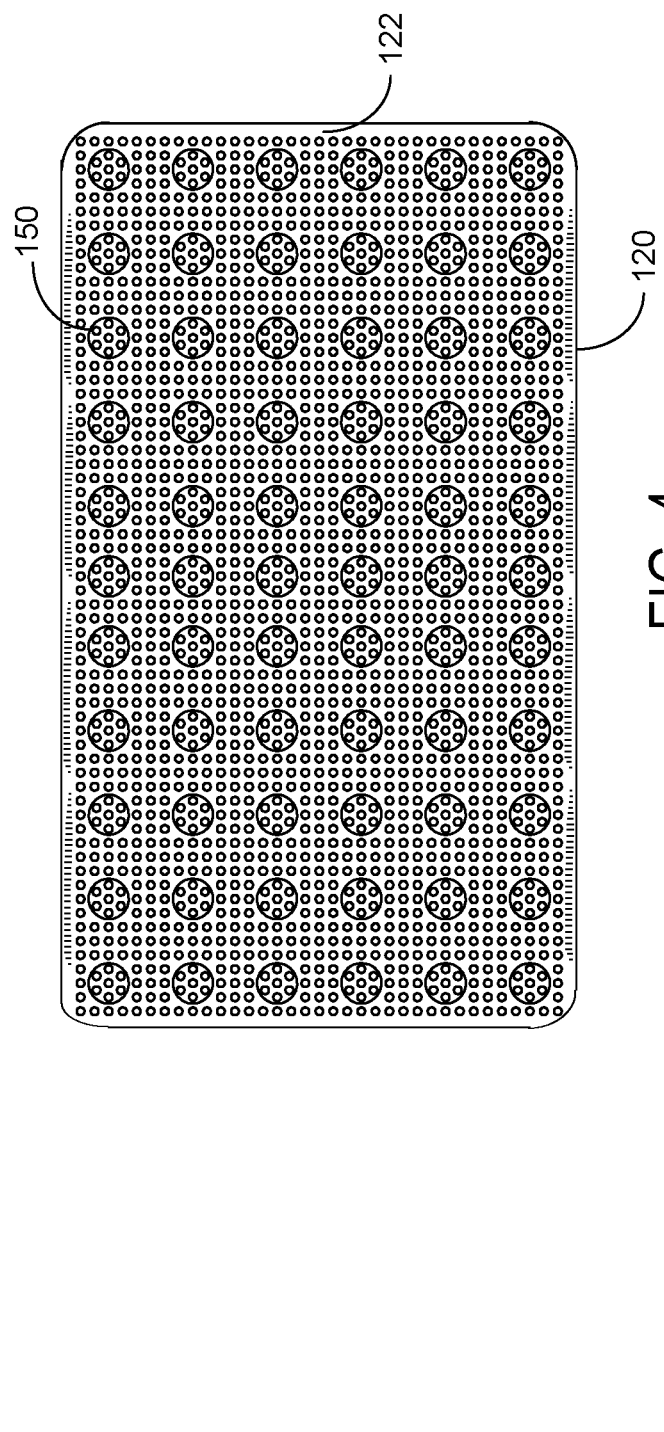
FIG. 4 is a plan view of another road-facing surface of the vehicle traction mat of FIG. 1, in accordance with yet another embodiment of the present disclosure.
Figure 5:
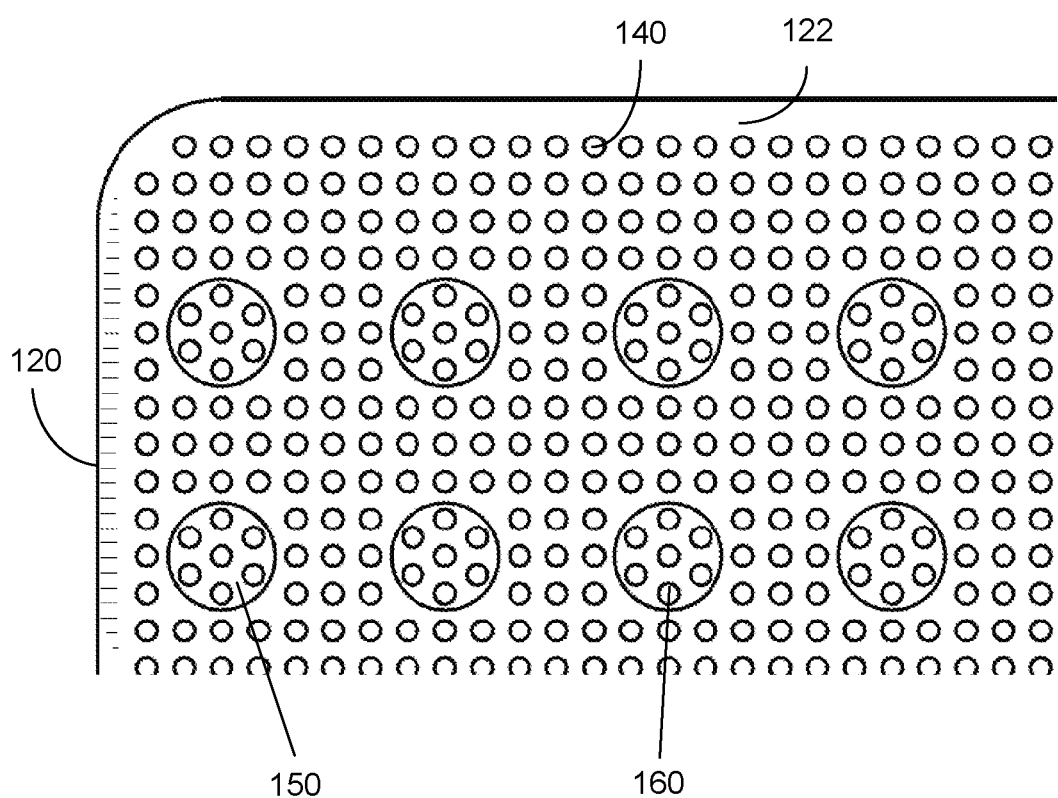
FIG. 5 is an enlarged partial plan view of the road-facing surface of the vehicle traction mat of FIG. 4 showing a plurality of knobs and cleats at a corner portion of the mat.

In another embodiment, the tire-facing surface 124 of main mat segment 120 is identical to the road-facing surface 122 shown in FIG. 4. Having knobs 150 with knob cleats 160 on the tire-facing surface 124 improves traction with the vehicle's tires particularly if their tread is worn out or if they are summer tires, as mentioned earlier. Additionally, due to the presence of surface cleats 140 between knobs 150 on tire-facing surface 124, the vehicle traction mat 100 may be used on either side. If one surface is damaged, for example, if some knobs 150 are dislodged, that surface may be used as the tire-facing surface and the opposite surface becomes the road-facing surface since typically a road-facing surface needs more traction than a tire-facing one does.

In another embodiment (not shown), the vehicle traction mat's surfaces 122 and 124 both have knobs, knob cleats, and cleats, but with different dimensions and distributions. For example, the surface 124 may be provided with a larger number of smaller knobs, while surface 122 may be provided with a smaller number of larger knobs. Different knob configurations may be suitable for different types of terrain. Advantageously, the traction mat may be suitable for different surfaces (mud, sand snow, or ice) depending on which surface (122 or 124) is used as a road-facing surface.

Figure 7:
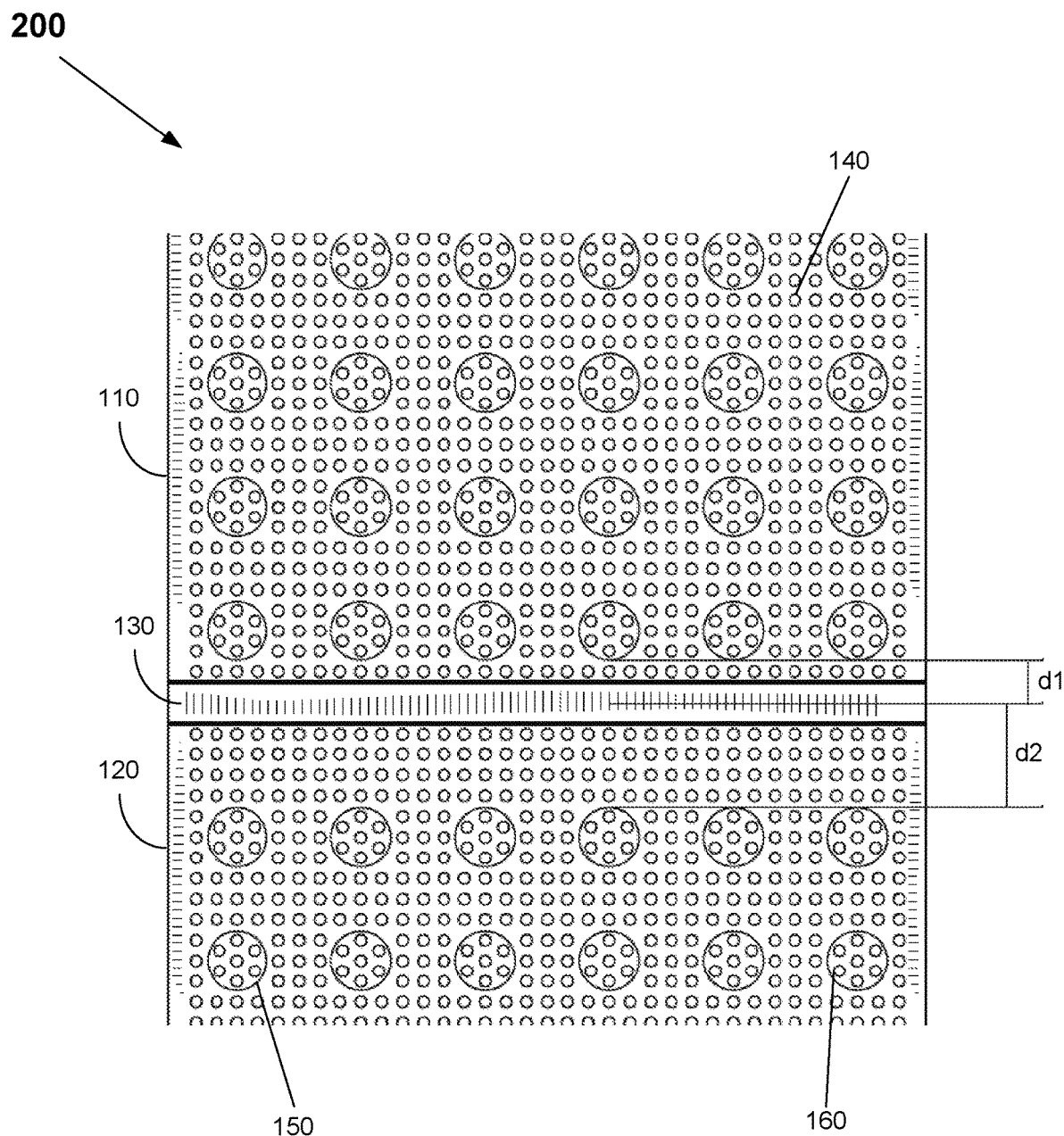
FIG. 7 is a close-up partial plan view of the road-facing surface of the vehicle traction mat of FIG. 6 showing the junction between the main mat segment, and the other mat segment.
Figure 8:
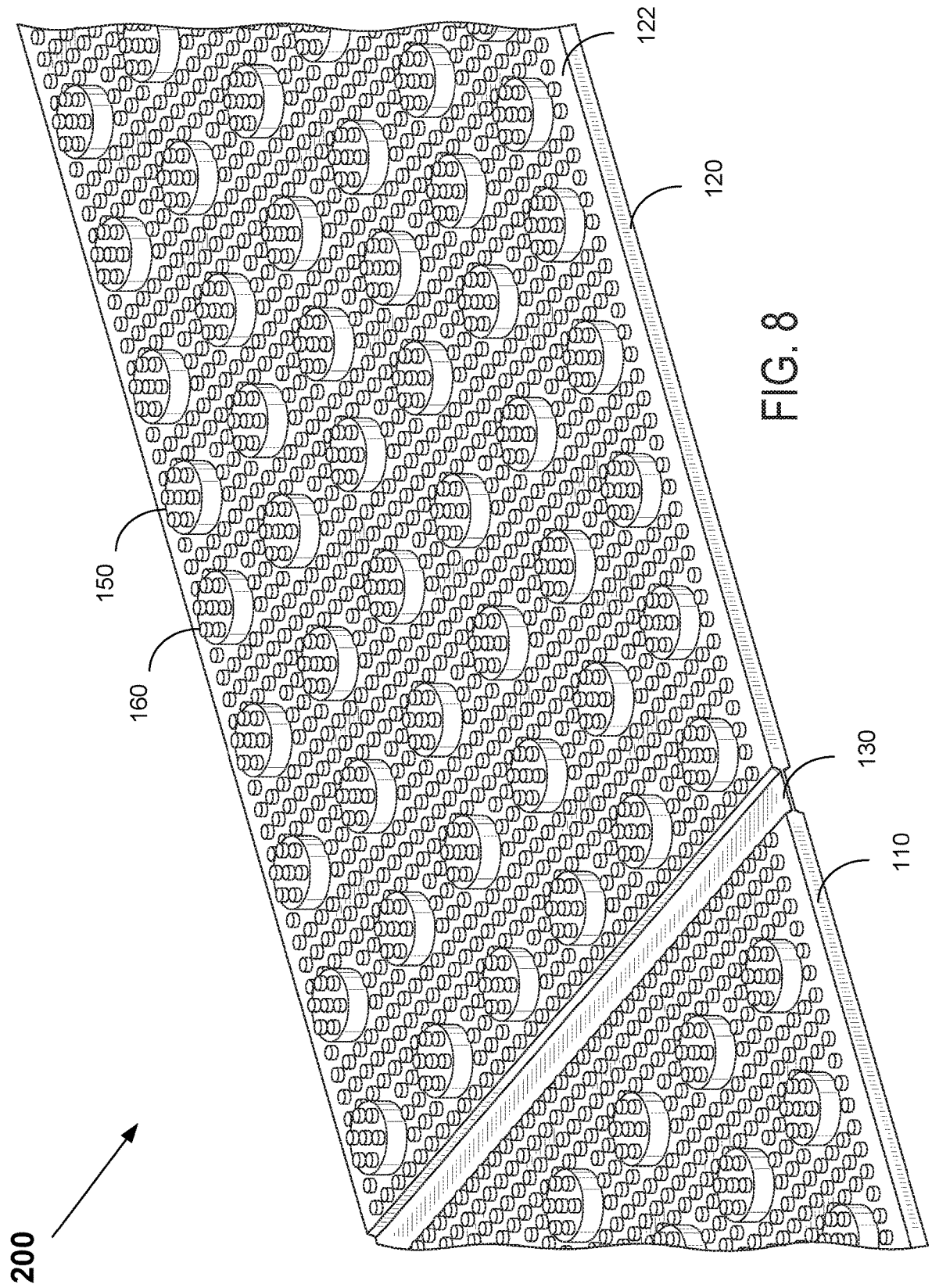
FIG. 8 is a close-up partial perspective view of the road-facing surface of the vehicle traction mat of FIG. 7 showing the junction between the main mat segment, and the other mat segment.
Figure 9:
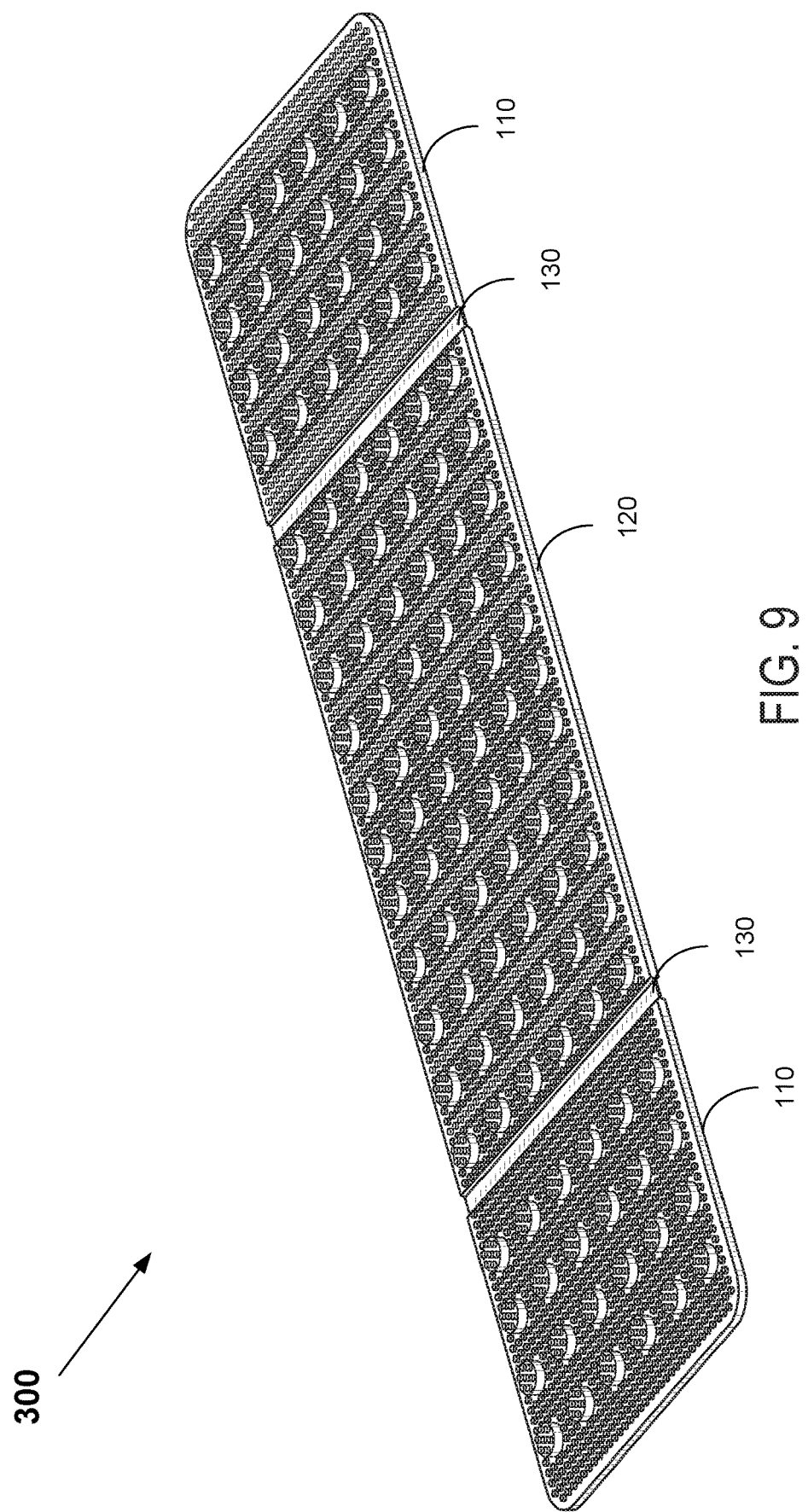
FIG. 9 is a perspective view of a road-facing surface of a vehicle traction mat featuring a main mat segment and two edge mat segments at opposing sides of the main mat segment, in accordance with an embodiment of the present disclosure.
Figure 10:
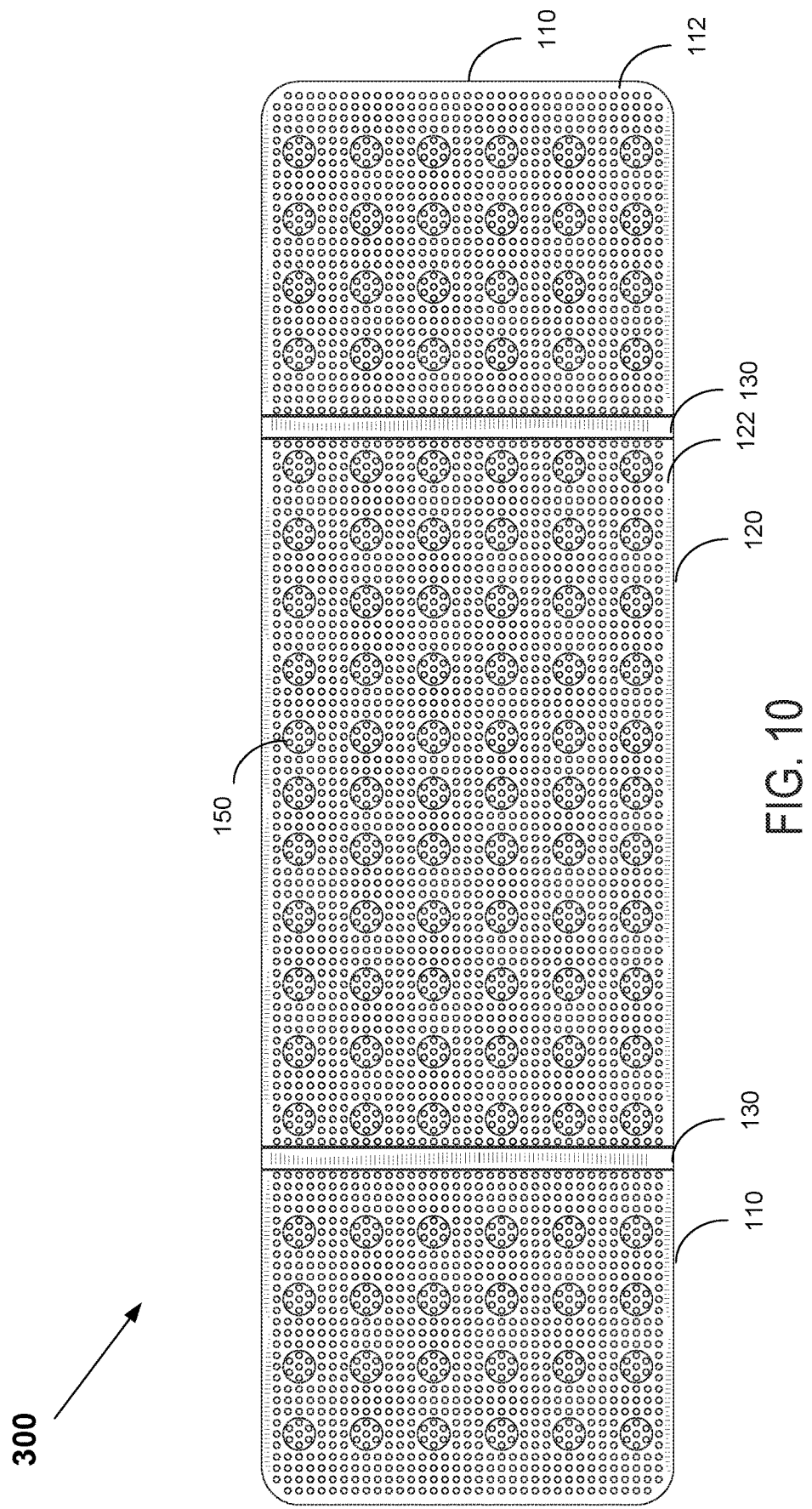
FIG. 10 is a plan view of the road-facing surface of the vehicle traction mat of FIG. 9.
Figure 11:
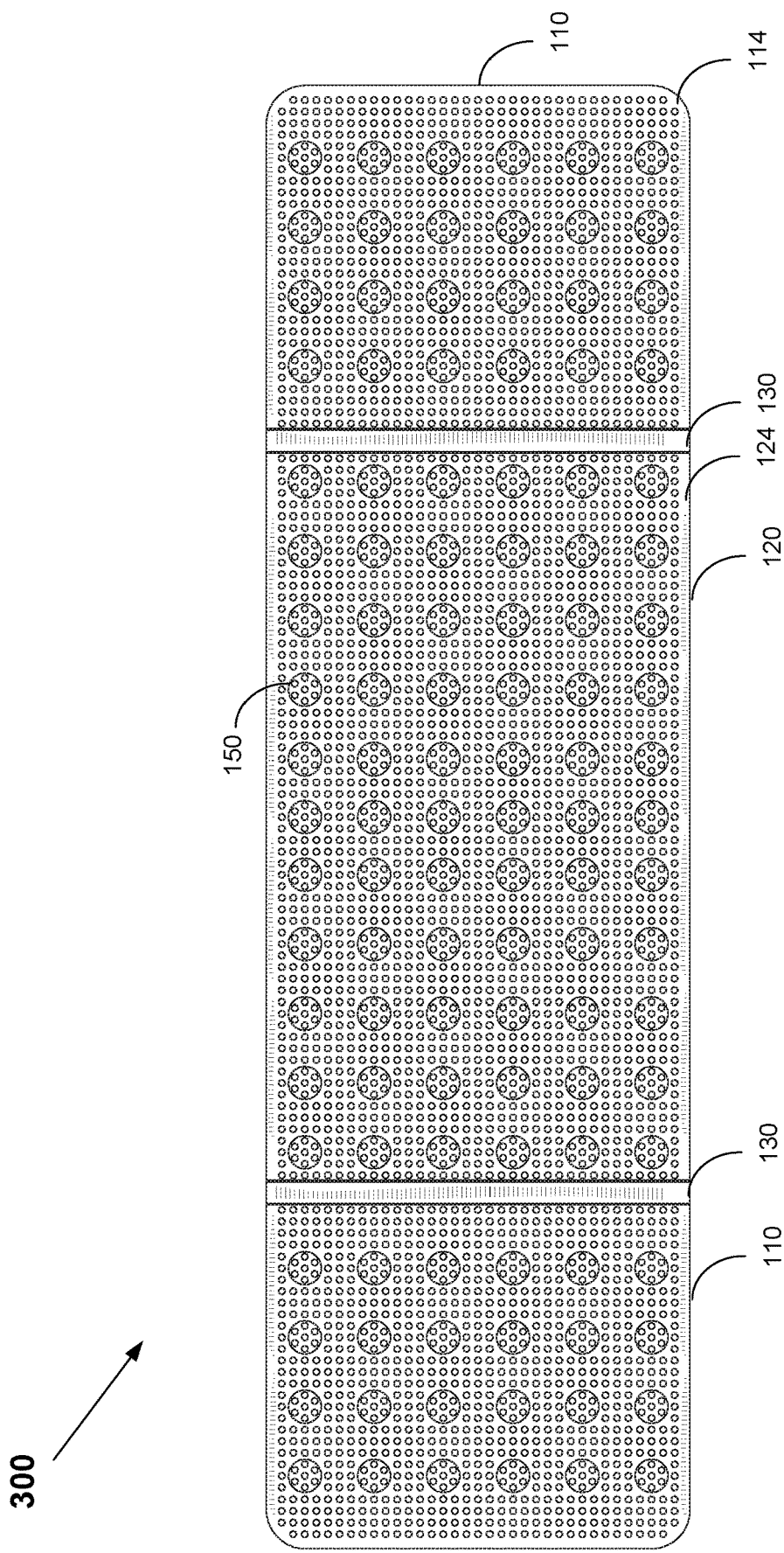
FIG. 11 is a plan view of the tire-facing surface of the vehicle traction mat of FIG. 9.

Another vehicle traction mat 200 is described with reference to FIGS. 6 to 8. Vehicle traction mat 200 comprises a main mat segment 120, and at least one other mat segment 110. The two mat segments are connected to one another via connecting means 130. Main mat segment 120 and other mat segment 110 are integrally formed, and connecting means 130 comprises a traverse strip of mat material of reduced thickness formed between the main mat segment 120 and the other mat segment 110. This is preferred to having two separate mat segments connected by mechanical means which may break or fail under harsh conditions. The connecting means 130 serve as a hinge around which mat segments 110 and 120 may be folded to have a reduced area for storage purposes.

Figure 6:
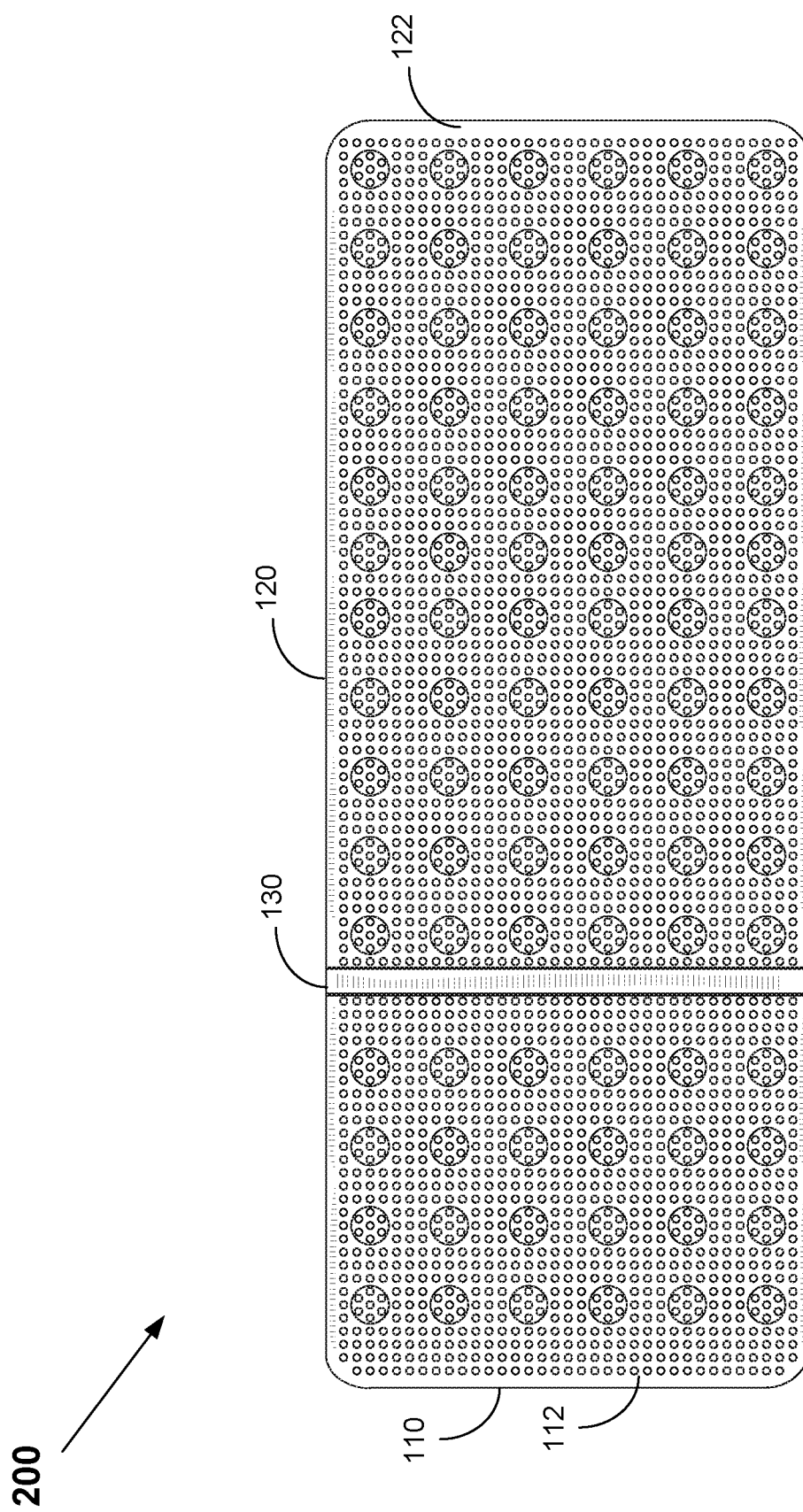
FIG. 6 is a plan view of a road-facing surface of a vehicle traction mat featuring a main mat segment and another mat segment, in accordance with an embodiment of the present disclosure.

With reference to FIG. 6, the main mat segment 120 has a longer length that the other mat segment 110. In another preferred embodiment (not shown) both mat segments have the same shape and dimensions, and connecting means 130 are at the center portion between the two mat segments. The advantage of having two mat segments of the same size is that when the traction mat 200 is folded, the overall area thereof is substantially the same as the area of each of the two segments. Accordingly, this provides for an optimal overall size when the main mat segment 120 and the other mat segment 110 are folded onto one another in a fully folded position.

The vehicle traction mat 200 may have a rough tire-facing surface 124 similar to that of FIG. 2, on both the main segment and the other segment. Alternatively, the tire-facing surface of both the main mat 120 segment and the other mat segment 110 may be provided with surface pleats 140 only, similar to surface 124 of FIG. 3. In another embodiment, the tire-facing surface 124 of the main mat segment 120 and the tire-facing surface 114 of the other mat segment 110 may each be provided with knobs 150, knob pleats 160, and surface pleats 140.

The vehicle traction mat 200 may have a rough tire-facing surface 124 similar to that of FIG. 2, on both the main segment and the other segment. Alternatively, the tire-facing surface of both the main mat 120 segment and the other mat segment 110 may be provided with surface, cleats 140 only, similar to surface 124 of FIG. 3. In another embodiment, the tire-facing surface 124 of the main mat segment 120 and the tire-facing surface 114 of the other mat segment 110 may each be provided with knobs 150, knob, cleats 160, and surface cleats 140.

While the surface configuration for both the main mat segment 120 and the other mat segment 110 are shown to be similar, other embodiments where the main and other segments may be of different configurations are contemplated. For example, the dimensions and/or distribution of the knobs 150 on the road-facing surface 122 may be different than that of road-facing surface 112. This may be useful, for example, if the vehicle is stuck in a large pothole where the bottom surface of the pothole has a surface with different properties from the sidewalls of the pothole, then a one mat segment is placed at the bottom while the other rests on the sidewalls for optimal traction.

FIGS. 9-20 depict vehicle traction mat 300, in accordance with another embodiment of the present disclosure. Vehicle traction mat 300 features a main mat segment 120 and two edge mat segments 110. As discussed above, the mat segments may be integrally formed and connected via connecting means such as a strip of material of reduced width formed between the main mat segment 120 and each of the edge mat segments 110. For example, connecting strip 130 may have a thickness of 2 mm or another suitable thickness that allows traction mat 300 to be folded as shown in FIG. 17 to FIG. 20, while at the same time providing enough strength to resist tearing.

Vehicle traction mat 300 is shown to have a generally rectangular shape; however, other generally planar shapes are also contemplated. For example, main mat segment 120 may be rectangular, while edge mat segments 110 may be semi-circular, semi-elliptical, triangular, or trapezoidal. In some embodiments, the tire-facing surfaces (124, 114) are rough. In other embodiments, the tire-facing surfaces (124, 114) have spaced-apart surface cleats 140 to provide traction between a rotating vehicle tire (not shown) and the traction mat 300. The road-facing surfaces (122, 112) may be provided with knobs 150. As discussed earlier, knobs 150 may have the shape of a prism with a triangular, rectangular, square, or trapezoidal cross section. Knob cleats 160 provide extra traction to the mat with respect to the road surface. In another embodiment, the road-facing surfaces (122, 112) of the vehicle traction mat 300 may be provided with surface cleats 140 formed in spaces between knobs 150. In yet another embodiment, the tire-facing surfaces (124, 114) of vehicle traction mat 300 may be provided with knobs 150 and cleats 160 for providing additional traction between a rotating vehicle tire and the tire-facing surface. In the embodiment shown in the accompanying figures, vehicle traction mat 300 has identical surfaces, each provided with surface cleats 140, knobs 150, and knob-cleats 160. However, as previously discussed, the knobs 150 may have different sizes and spacing for each of the tire-facing and the road-facing surfaces.

Figure 12:
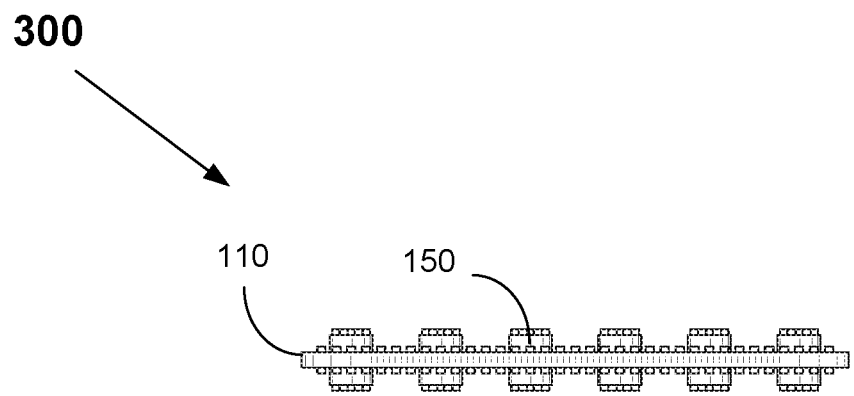
FIG. 12 is a left-side elevation view of the vehicle traction mat of FIG. 9.
Figure 13:
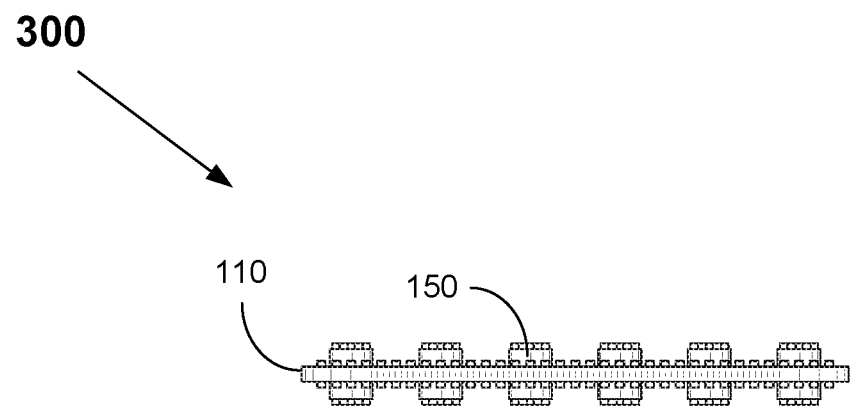
FIG. 13 is a right-side elevation view of the vehicle traction mat of FIG. 9.
Figure 16:
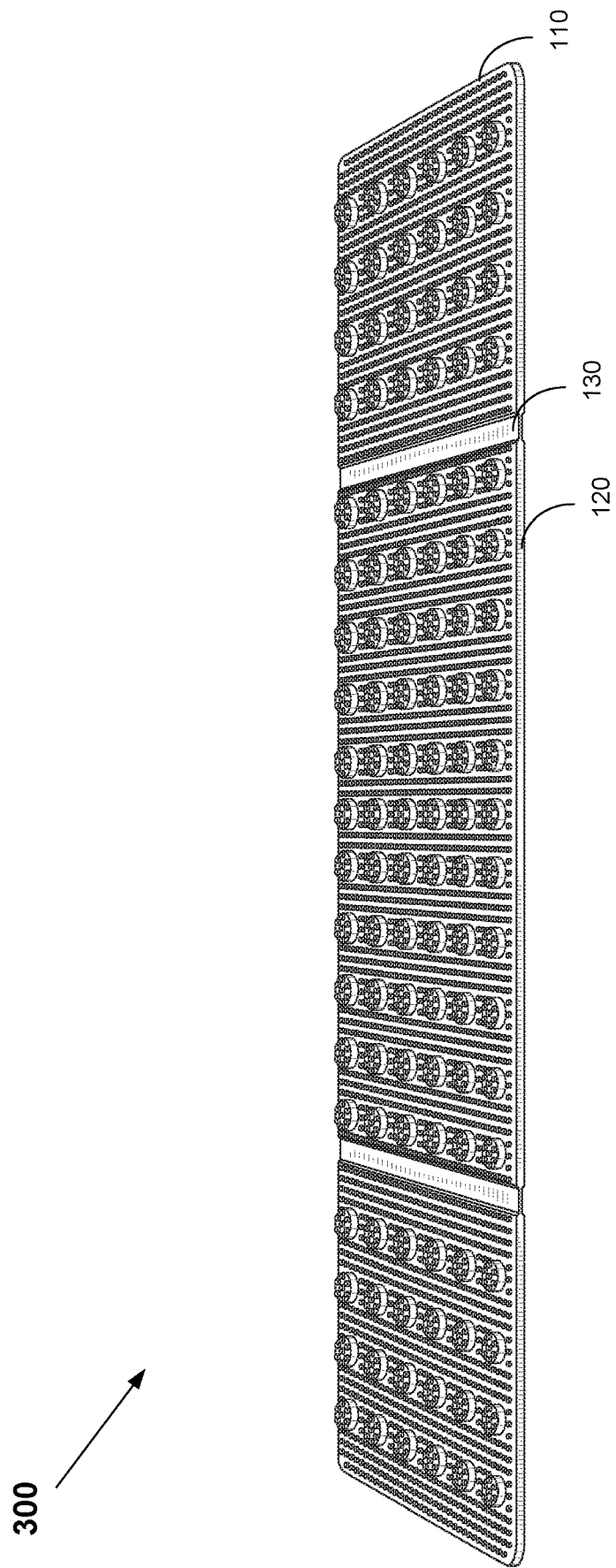
FIG. 16 is a top perspective view of the vehicle traction mat of FIG. 9 in an open, flat mode.
Figure 17:
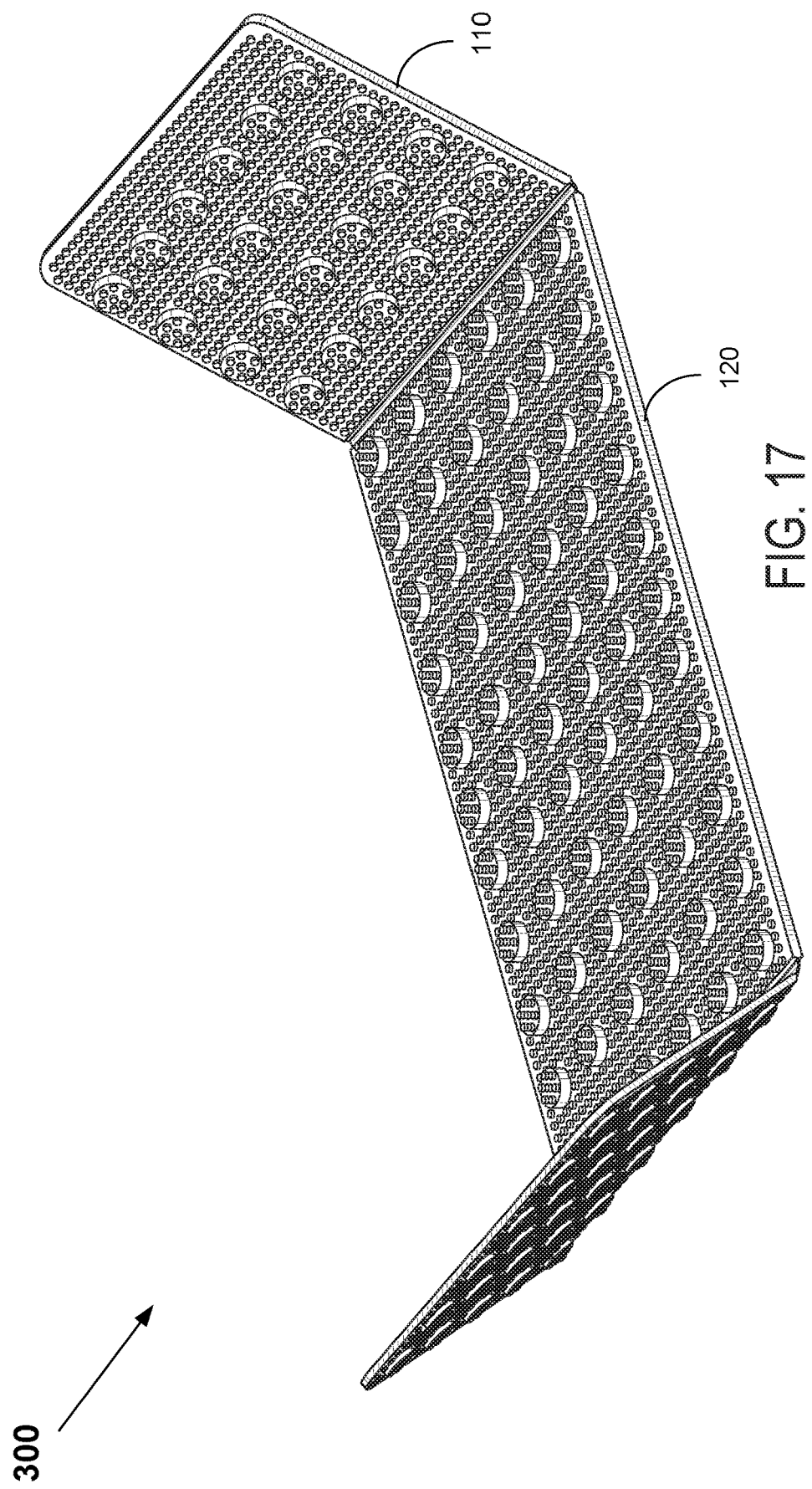
FIG. 17 is a top perspective view of the vehicle traction mat in a partially folded mode.
Figure 18:
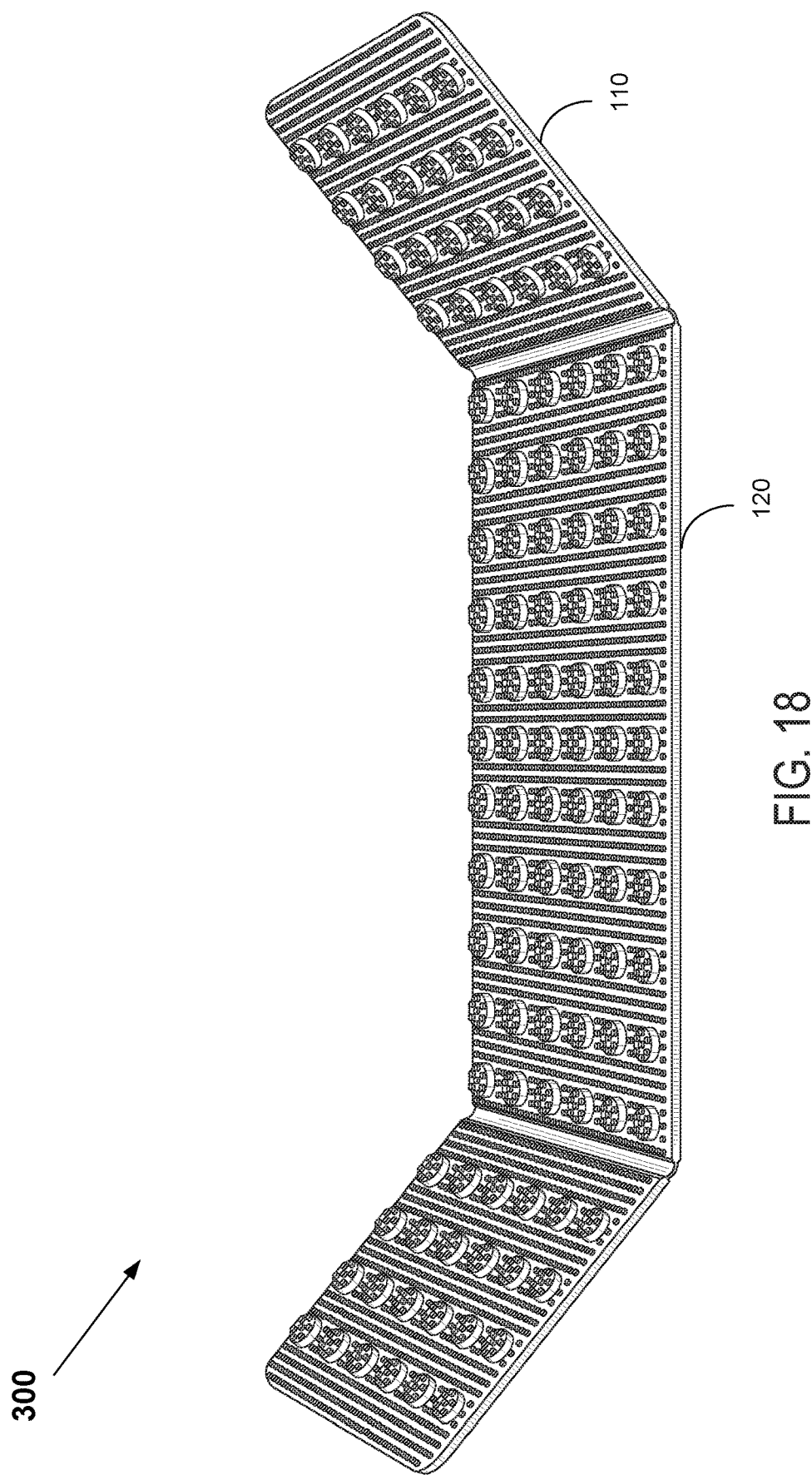
FIG. 18 is a top-front perspective view of the vehicle traction mat in the partially folded mode.
Figure 19:
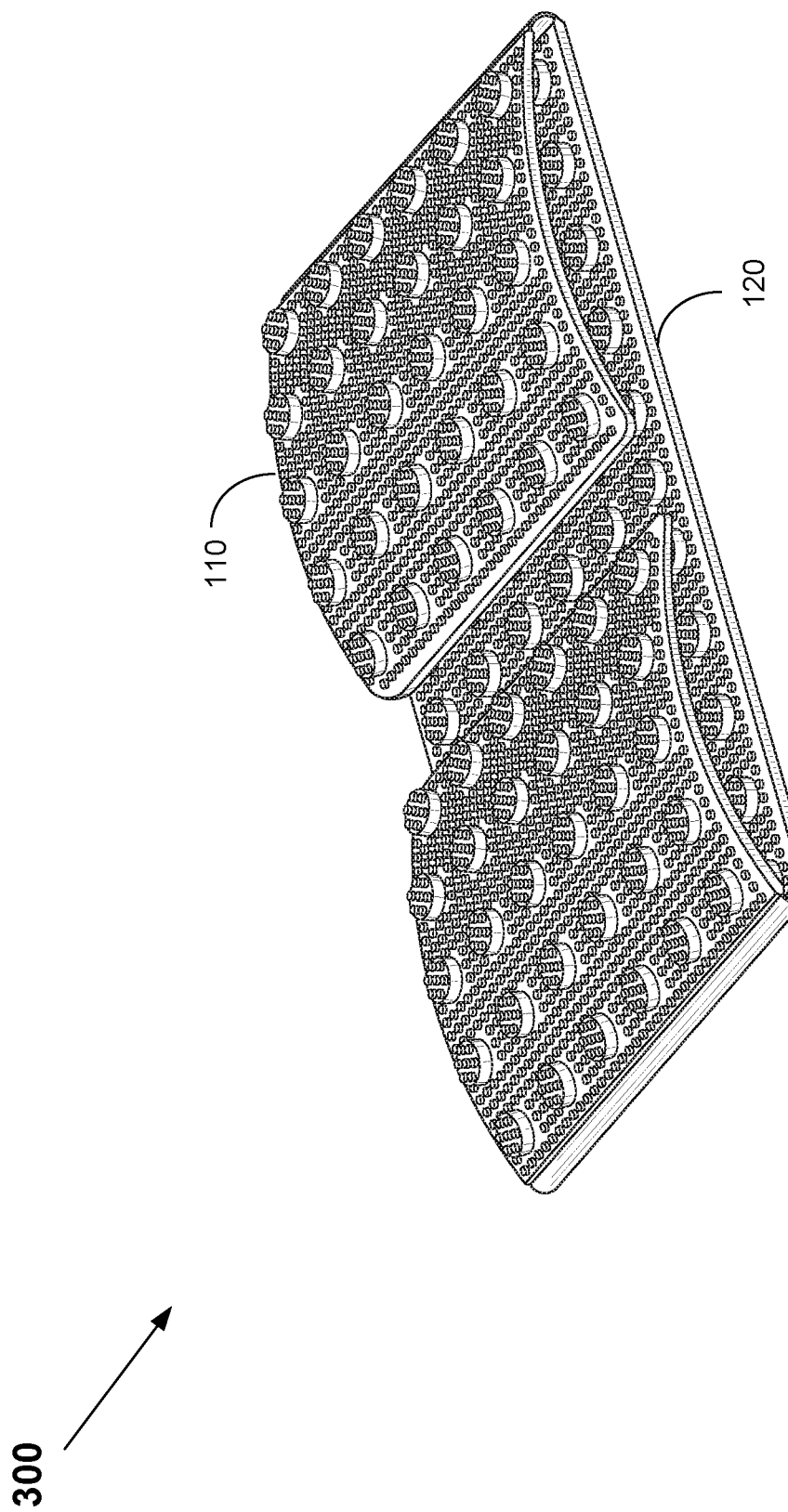
FIG. 19 is a top perspective view of the vehicle traction mat in a fully folded mode.
Figure 20:
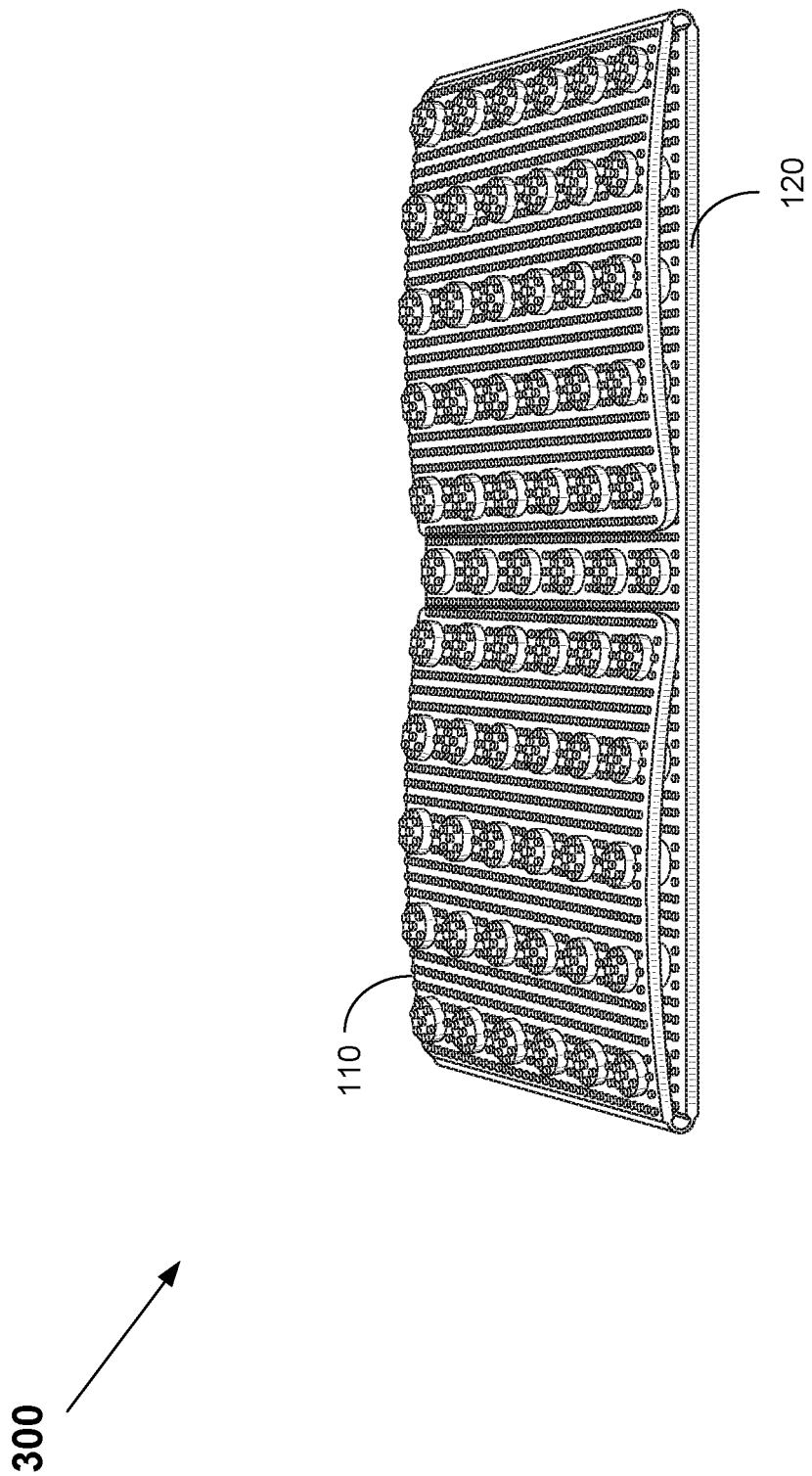
FIG. 20 is a top-front perspective view of the vehicle traction mat in the fully folded mode.

Although the figures depict the knobs 150 and cleats 140 to be evenly spaced, they may be scattered around the surface of mats 100, 200, or 300 in an uneven manner, or in a staggered pattern. While the knobs are shown to be organized in straight rows along the surface of the mats, this is not necessary as many arrangements are contemplated. The spacing between knobs 150 is chosen to prevent packed snow or mud from being stuck therein thus reducing traction. In a preferred embodiment a 15-25 mm spacing between knobs 150 is contemplated. The height of knobs 150 may be in the range of 5-15 mm, but other ranges are also contemplated depending on the expected road surface condition. The diameter or side of the knobs may be in the range of 10-30 mm but other dimensions are also contemplated depending, in part on the shape of the knobs, and the terrain or road surface condition. Different size and spacing ranges are contemplated based on various considerations such as tire size, vehicle weight, and desired storage size requirements. The higher knobs 150 are, for example, the more space the mats 200, and 300 will take up when folded. In some embodiments, knobs 150 may be staggered on the surface of vehicle traction mat 100 such that knobs 150 from the edge mats 110 would fit into the spaces between knobs 150 on the main mat segment 120, when edge mat segments 110 are folded towards main mat segment 120. As a result, the effective thickness of the folded vehicle traction mat 100 is reduced. Main mat segment 120 and edge mat segments 110 may be dimensioned for optimal size when vehicle traction mat 300 is folded. For example, as best seen in FIG. 12 and FIG. 13, edge mat segments 110 each has a length that is approximately half the length of main mat segment 120 such that when the traction mat 300 is folded, its length is substantially equal to that of main mat segment 120. Edge mat segments 110 need not be identical in size. For example one edge mat segment may have a longer length than the length of the other edge mat segment in which case the lengths of both edge segments would, added together, be less than or equal to the length of the main mat segment 120, and accordingly there would be a space therebetween in folded mode. In some embodiments a plurality of mat segments (not shown) are used and may be fan-folded for optimal storage dimensions. For example, a vehicle traction mat comprised of four square segments arranged longitudinally and connected to one another by connecting means in a fan-fold arrangement. The vehicle traction mat can be fan-folded so as to take up the space area of a single square segment and four times the thickness of a square segment. In another embodiment, the mat may be comprised of three square mat segments arranged as an L-shape.

The above-described embodiments are intended to be examples of the present invention and alterations and modifications may be effected thereto, by those of skill in the art, without departing from the scope of the invention that is defined solely by the claims appended hereto.

What is claimed is:
1. A vehicle traction mat, comprising:
a first mat segment having a tire-facing surface and a road-facing surface;
a second mat segment having a tire-facing surface and a road-facing surface, the second mat segment being foldably connected at an edge thereof to an edge of the first mat segment via connecting means;
a first plurality of spaced-apart knobs extending from the road-facing surface of at least one of the first and second mat segments, for digging into a road surface wherein the road surface comprises one or more of packed snow, ice, mud, and sand, thereby providing traction between the vehicle traction mat and the road surface; and
a first plurality of spaced-apart-knob-cleats formed on a top surface of at least some of the first plurality of spaced-apart knobs for providing additional traction between the vehicle traction mat and the road surface,
wherein the first plurality of spaced-apart knobs are shaped and sized for digging into the road surface to provide traction in the one or more of packed snow, ice, mud, and sand; and
wherein at lease some of the first plurality of spaced apart knobs are tapered outwardly from the vehicle traction mat.
2. The vehicle traction mat of claim 1, wherein the first plurality of spaced-apart knobs are shaped and sized for digging into the road surface to provide deep traction in packed snow.

* * * * *